Aug. 6, 1940.   W. R. LUSTIG   2,209,986
LID SUPPORT
Filed Nov. 23, 1936   2 Sheets-Sheet 1
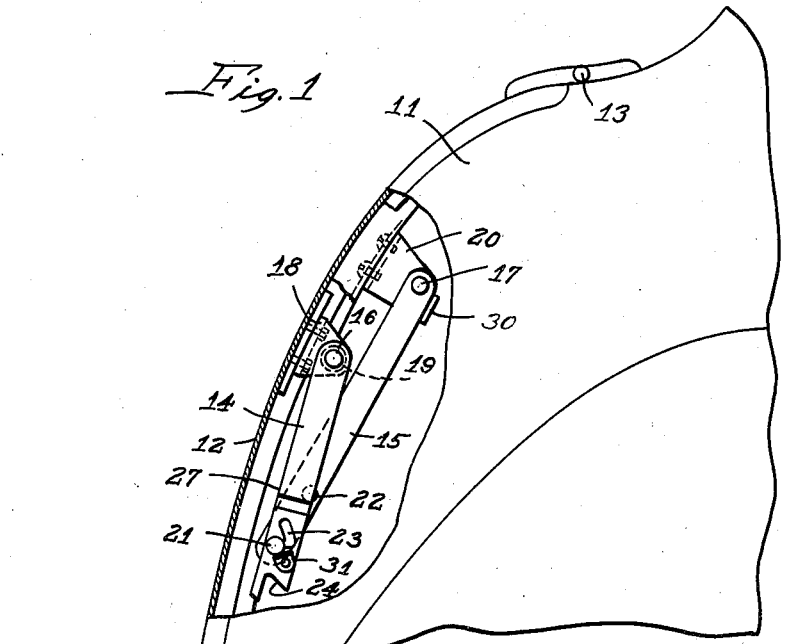
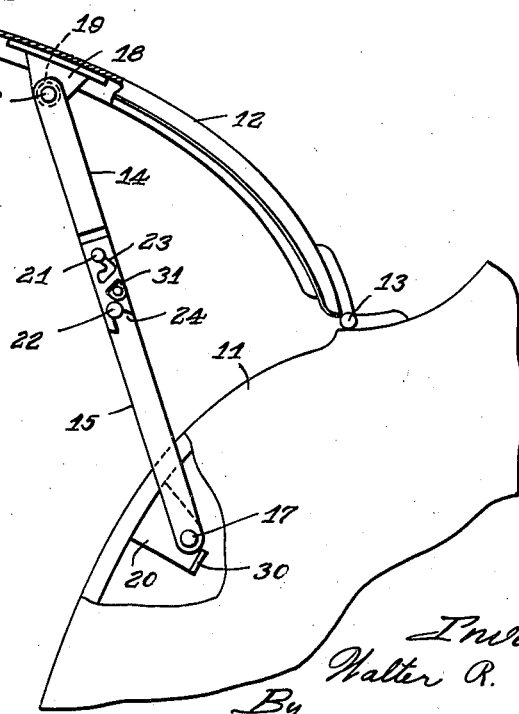

Aug. 6, 1940.                W. R. LUSTIG                2,209,986
                              LID SUPPORT
                         Filed Nov. 23, 1936          2 Sheets-Sheet 2
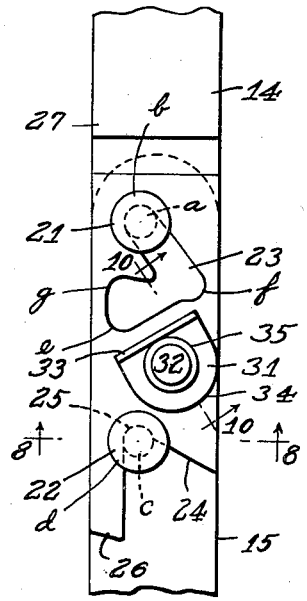
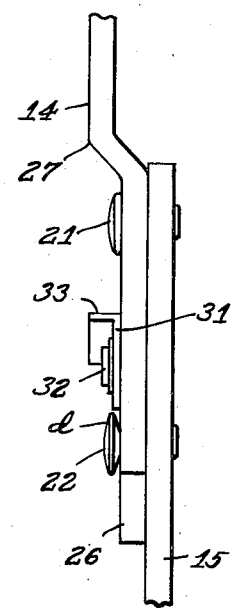
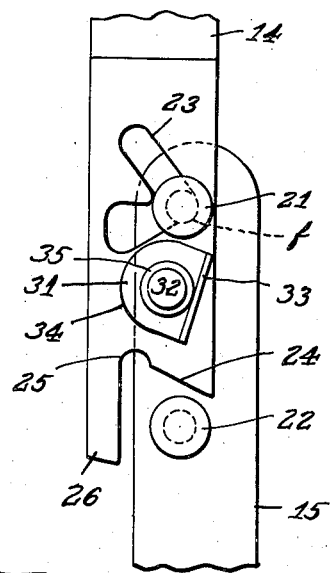
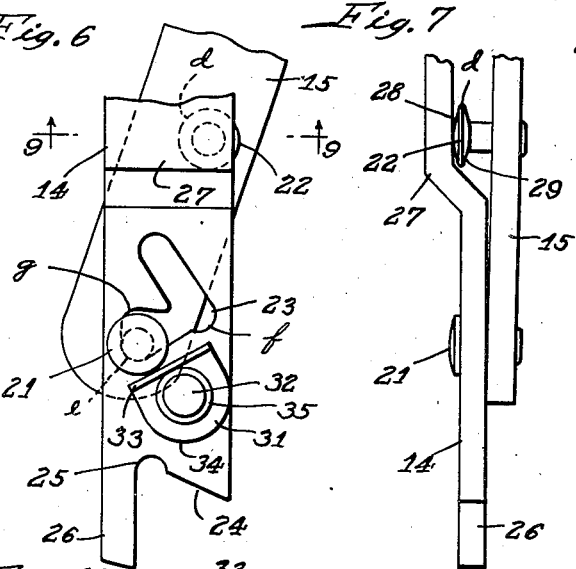
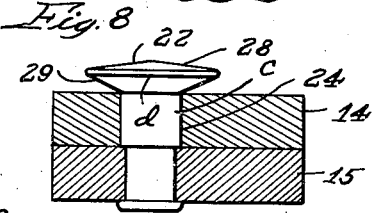
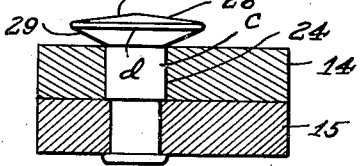
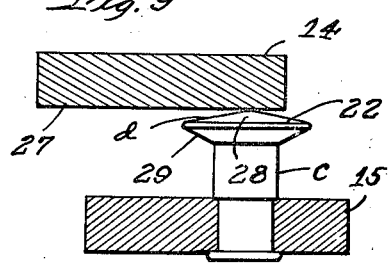
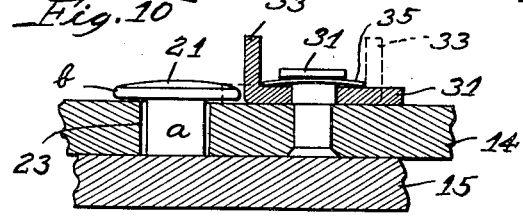

Patented Aug. 6, 1940

2,209,986

UNITED STATES PATENT OFFICE 2,209,986

LID SUPPORT

Walter R. Lustig, Rockford, Ill., assignor to The Atwood Vacuum Machine Company, Rockford, Ill., copartnership of Seth B. Atwood and James T. Atwood Application November 23, 1936, Serial No. 112,192

13 Claims. (Cl. 217—60)

This invention relates generally to supports for liftable hinged closures, and has particular reference to a lid support for use on the luggage compartment of an automobile or other vehicle.

The principal object of my invention is to provide a lid support constructed generally along the lines of the phonograph lid support disclosed in Thompson Patent 1,912,105, issued May 30, 1933, but containing improvements whereby the support is adapted for use on a luggage compartment lid for an automobile or other vehicle.

Briefly stated, the lid support of my invention embodies the following features:

1. The provision of a projection on the free end of one of the arms which strikes the free rivet on the end of the other arm to insure breaking of the joint always in one direction;

2. The provision of the free rivet on the one arm of the proper length and preferably with a rounded head to make sliding wedging engagement with the side of the other arm when the arms fold, whereby to eliminate play and prevent rattling, the head also having a beveled bottom surface for camming the levers toward one another when they interengage in supporting position, so as to eliminate play and thereby avoid wabbliness in the support;

3. The provision of a limiting stop for the freely pivoted arm to prevent the two arms from folding too far into the luggage space, and 4. The provision of a safety lock on the slotted arm adjacent the slot which when moved into operative position prevents the rivet in the other arm from moving out of a certain position in the slot, whereby to prevent accidental unlocking and folding of the support, as, for example, under wind pressure.

The invention is illustrated in the accompanying drawings, in which—

Fig. 1 is a side view of the rear portion of an automobile, broken away to show a support made in accordance with my invention applied to the luggage compartment lid, the support being shown folded with the lid closed;

Fig. 2 shows the support unfolded and supporting the lid in raised position;

Fig. 3 is an enlarged side view of the interlocked ends of the arms in the position of Fig. 2;

Fig. 4 is a front view of Fig. 3;

Fig. 5 is a view similar to Fig. 3, showing how the safety lock when turned to operative position prevents folding the support;

Fig. 6 is an enlarged side view of the same portions of the arms in the folded position shown in Fig. 1;

Fig. 7 is a front view of Fig. 6;

Fig. 8 is an enlarged sectional detail taken on the line 8—8 of Fig. 3;

Fig. 9 is an enlarged sectional detail taken on the line 9—9 of Fig. 6, and

Fig. 10 is an enlarged sectional detail taken approximately on the line 10—10 of Fig. 3, but showing in full lines how the rivet is movable past the safety lock under normal conditions, but held against movement when the safety lock is turned, as indicated in dotted lines.

The same reference numerals are applied to corresponding parts throughout the views.

Referring to Figs. 1 and 2, 11 designates the luggage compartment of an automobile and 12 its lid or door hinged, as indicated at 13, to permit raising and lowering to and from the open position illustrated in Fig. 2. The lid support of my invention, as indicated above, is an improvement on that disclosed in Thompson Patent 1,912,105, and, like that support, comprises two supporting arms or links 14 and 15 pivotally attached, as at 16 and 17, to an edge portion of the lid 12 and to the side wall of the luggage compartment 11, respectively. A small sheet metal bracket 18 fastened to the lid carries the pivot stud 16, and a friction washer 19 is interposed between the bracket 18 and the end of the arm 14 to provide a certain amount of drag on the pivotal movement of the arm with respect to the stud 16. Another bracket 20 is fastened to the side wall of the luggage compartment and carries the pivot stud 17 for the arm 15. Two rivets or headed pins 21 and 22 are provided on the free end of the arm 15. The rivet 21 has its reduced shank $a$ (Fig. 3) slidable in the generally V-shaped slot 23 provided in the free end of the arm 14, the head $b$ preventing disengagement of the rivet from the slot, so that the arms 14 and 15 are permanently connected for pivotal and sliding motion with respect to one another. The rivet 22, on the other hand, is slidable into and out of engagement with the notched end 24 of the arm 14, the reduced shank $c$ in the supporting position being arranged to engage in the offset inner end 25 of the notch, and the head $d$ of the rivet serving by engagement with the side of the arm 14 to prevent disengagement (see Fig. 8).

In operation, it will be assumed that the arms 14 and 15 are folded as in Figs. 1 and 6 with the lid 12 closed. As the lid is raised, the arm 14, being restrained frictionally by the washer 19, will allow the rivet 21 to move from the recess $e$ at one end of the slot 23 over into the recess $f$ at the middle of the slot, after which the arm 14 will be swung on its pivot 16 by the arm 15 while the rivet 21 forms the fulcrum at the point f, until the two arms are brought into alignment end to end, when the lid 12 can be raised no farther. The arms are then approximately in the position shown in Fig. 5 with the rivet 22 below the notch 24. Now, the operator allows the lid to come down, and in so doing the rivets 21 and 22 are caused to ride home in the slots 23 and 24, respectively, in which positions they are shown in Figs. 2 and 3. This is the supporting position. The lid 12 under these conditions is securely supported and there is no likelihood of its falling accidentally like there was with the old dead-center type of lid supports. It takes a definite deliberate movement of the lid upwardly to break the joint and bring about the folding of the support. The lid will not fall by reason of some accidental contact with or pressure against the support as in the dead-center type. To lower the lid, one must raise it sufficiently for the rivet 21 on the arm 15 to ride down into the crotch at the middle of the slot 23, whereupon the arm 15 will swing by gravity in a counterclockwise direction about the pivot 17 as a center, as viewed in Fig. 2, and the rivet 21 will move into the other end of the slot 23 adjacent the recess e. This operation is accompanied by a definite clicking sound as the rivet 21 strikes the end of the slot 23. Then the operator allows the lid to come down and the first thing that occurs is the engagement of the rivet 21 in the recess g opposite the recess e in the end of the slot 23. Such engagement avoids danger of the rivet becoming accidentally disengaged as the lid comes down, and finding its way back into the other end of the slot 23. It also assures passage of the rivet 22 past the free end of the arm 14 as the arms 14 and 15 commence to fold. The rivet 21 having moved sufficiently to one side of a line passing through the pivots 16 and 17, the arms fold readily under the weight of the lid 12, and, of course, the operator usually keeps hold of the lid as it comes down so that no unnecessary shock or strain is imposed upon the hinges 13 or other parts.

In accordance with my invention, I proved the lug 26 on the free end of the arm 14 adjacent the notch 24 which, when the arms 14 and 15 are swung into alignment as the lid 12 is raised, will, if need be, come into engagement with the rivet 22 at the limit of the upward movement of the lid to prevent the arms from folding inwardly toward the hinges 13. There is, of course, no likelihood of this occurring under ordinary conditions when the lid is raised at a moderate speed, but if one were to raise the lid quickly enough so that the momentum of the arms 14 and 15 in swinging about their pivots 16 and 17 should tend to carry them past the position of alignment referred to, then, of course, the arms could fold inwardly toward the hinges 13 when the lid 12 was lowered. The projection 26 prevents such a thing from occurring, and always insures folding of the arms in one direction, namely, away from the hinges 13 as in Fig. 1.

It will also be observed in Figs. 1, 6, and 9 that the rivet 22 is of such a length in relation to the offset 27 provided in the arm 14 next to the slotted end, that when the arms fold, the rounded top 28 of the head d of the rivet will have sliding wedging engagement on the inside of the arm 14 to set up a binding action at the pivotal connection 21 between the two arms, and also to a certain extent at the pivots 16 and 17, so that all play is taken up and there is no likelihood of the support rattling when the car is in motion. Fig. 7 illustrates the way in which the rivet 22 forces the arms 14 and 15 apart, thus placing a stress or strain on the rivet 21 and making the folded support rigid. The beveled bottom surface 29 of the head d serves to cam the notched end 24 of the arm 14 toward the arm 15 as the arms interengage in supporting relation; that is, as the arms move from the relationship shown in Fig. 5 to that shown in Figs. 3 and 4. In that way the arms are brought into tight engagement and kept so engaged, as indicated in Fig. 4, so that there is no play between the arms and consequently no tendency toward wabbliness.

A lug 30 is provided on the bracket 20 in a predetermined spaced relation to the pivot 17, as shown in Figs. 1 and 2. The arm 15, in folding, strikes this lug and in that way keeps the arms from folding too far into the luggage space. This lug also provides support for the arm 15 during the binding or wedging action previously described, namely, when the offset portion 27 rides onto the rounded head d of the rivet 22, as shown in Fig. 1.

The safety lock which I shall now describe is one which is not considered essential to the success of this lid support. That is to say, the lid support, even though not equipped with such a safety lock, is sufficiently positive in its operation to be classed as entirely safe. It is only when the support may be used in a heavy wind or under special circumstances requiring additional assurance that the lid cannot close, that the use of this safety lock is apt to be required. It consists simply in the provision of a plate or washer 31 pivoted on a stud 32 on the free end of the arm 14 adjacent one leg of the V-shaped slot 23 and having an upturned straight flange 33 providing a finger hold for use in turning the plate from one position to another. The flange is in closely spaced relation to the pivot 32—closer than the semi-circular periphery 34 of the plate, and hence when the plate is turned so that the flange 33 is parallel to the adjacent side of the slot 23, there is greater clearance alongside the slot, as shown in Figs. 3 and 6, than when the plate is turned so that the semi-circular periphery is adjacent the slot, as in Fig. 5. The plate is so located with respect to the slot that when the flange 33 is parallel to the slot, as in Figs. 3 and 6 and as shown in full lines in Fig. 10, the head b of the rivet 21 can move freely along the adjacent leg or branch of the slot 23, but when the plate is turned so that any portion of the semi-circular periphery is adjacent the slot, as shown in Fig. 5 and in dotted lines in Fig. 10, the rivet 21 cannot pass, but is confined in the one branch of the slot 23 as shown in Fig. 5, thus making it impossible for the lid support to fold; consequently, the lid cannot drop. It is only when this safety lock is released by the operator that the lid may be closed. The head of the rivet 32 has a spring washer 35 compressed therebeneath, as indicated in Fig. 10, which serves to hold the plate 31 frictionally in adjusted position. There is therefore no likelihood of the plate turning accidentally from one position to another.

It is believed the foregoing description conveys a good understanding of the objects and advantages of my invention. The appended claims have been drawn with a view to covering all legitimate modifications and adaptations.

I claim:

1. A lid support comprising a first arm pivotally attached to a lid, a second arm pivotally attached to a receptacle, said first arm having a free end portion bent into offset but parallel relation to the rest of the arm, the offset end portion having a slot provided therein and the extremity thereof having a notch provided therein, a first pin on the free end of the second arm operating in the slot and thereby pivotally and slidably connecting the free ends of said arms, a second pin on the second arm in longitudinally spaced relation to the first pin arranged to enter the notch when the arms are in supporting relation, and a head on the end of said pin to prevent endwise displacement of the pin from the notch, the outer surface of the head being rounded and the pin being of sufficient length so that said surface makes sliding wedging engagement with the first arm next to its offset end portion in the folding of the arms, and the inner surface of said head being bevelled so as to cam the notched end of the first arm toward the second arm when the arms move into supporting relationship.

2. A lid support comprising a first arm pivotally attached to a lid, a second arm pivotally attached to a receptacle, said first arm having a free end portion bent into offset but parallel relation to the rest of the arm, the offset end portion having a slot provided therein and the extremity thereof having a notch provided therein, a first pin on the free end of the second arm operating in the slot and thereby pivotally and slidably connecting the free ends of said arms, a second pin on the second arm in longitudinally spaced relation to the first pin arranged to enter the notch when the arms are in supporting relation, and a head on the end of said pin to prevent endwise displacement of the pin from the notch, the inner surface of said head being bevelled so as to cam the notched end of the first arm toward the second arm when the arms move into supporting relationship.

3. A lid support as set forth in claim 1, including means adjacent the pivotal attachment of the second arm to the receptacle for limiting folding pivotal movement of the second arm, whereby the second arm is supported against movement during the sliding wedging engagement of the pin head with the first arm recited.

4. A lid support comprising two arms, one adapted to be pivoted to a lid and the other adapted to be pivoted to a receptacle, a slot provided in the free end of one arm and a pin on the free end of the other arm entered therein to pivotally and slidably connect said arms, said arms being thereby pivoted so as to be foldable into overlapping relation, the free end of the slotted arm also having a notch provided therein, the slotted arm having a portion thereof disposed in offset substantially parallel relation to the rest of the arm, and another pin on the other arm spaced from its free end arranged to engage in the notch to hold the arms rigidly in supporting relation, the last mentioned pin being of sufficient length so that the outer end thereof will have sliding wedging engagement with the inner face of the offset portion of the slotted arm in the folding of the arms so as to cause a binding of the first pin in the slot, for the purpose described.

5. A lid support as set forth in claim 4, including a bracket for pivotally mounting one of the arms, said bracket having a stop projection thereon for limiting the folding movement of the arm, whereby in the relative movement of the arms in folding the stopped arm is supported for the wedging and binding action referred to.

6. A lid support comprising two arms, one adapted to be pivoted to a lid and the other adapted to be pivoted to a receptacle, a slot provided in the free end of one arm and a pin on the free end of the other arm entered therein to pivotally and slidably connect said arms, the free end of the slotted arm also having a notch provided therein, another pin on the other arm spaced from its free end arranged to engage in the notch to hold the arms rigidly in supporting relation, and a manually operable safety device on the slotted arm movable from a retracted position relative to the slot to a position preventing movement of the pin in the slot whereby to prevent folding of the arms.

7. A lid support comprising two arms, one adapted to be pivoted to a lid and the other adapted to be pivoted to a receptacle, a slot provided in the free end of one arm and a pin on the free end of the other arm entered therein to pivotally and slidably connect said arms, the free end of the slotted arm also having a notch provided therein, another pin on the other arm spaced from its free end arranged to engage in the notch to hold the arms rigidly in supporting relation, and a manually operable safety device on the slotted arm rotatable to a position holding the pin in the slot so as to prevent folding of the arms.

8. A lid support comprising an arm pivotally attached to a lid, an arm pivotally attached to a receptacle, said arms adapted to cooperate in such a manner that the arms automatically assume the relative positions necessary to lock together to form a support as the lid is raised and automatically assume relative positions of release preparatory to folding as the lid is about to be closed in order to allow closure to be effected, the arms being connected by a pin and slot connection, the slot being of substantially V formation and provided in one arm near the free end thereof and a pin being entered in said slot and carried on the second arm, said first arm having a notch provided in the free end thereof, another pin on the second arm below the first pin and arranged to enter the latter notch in the interlocked supporting relation of said arms, and a safety lock device movably mounted on the first arm and having a straight sided portion which when moved into parallelism with the adjacent branch of the V slot permits movement of the first pin freely along said branch to permit folding of the arms, said device having another portion which when moved into position adjacent the slot prevents movement of the first pin into the adjacent branch of the slot so as to prevent folding of said arms.

9. A lid support comprising two arms, one adapted to be pivoted to a lid and the other adapted to be pivoted to a receptacle, a slot provided in the free end of one arm and a pin in the free end of the other arm entered therein to pivotally and slidably connect said arms, the free end of the slotted arm also having a notch provided therein, another pin in the other arm spaced from its free end arranged to engage in the notch to hold the arms rigidly in supporting relation, and a rotary plate on the slotted arm having a semi-circular periphery on one side of the pivot and concentric therewith, and an upturned straight flange on the other side of the pivot and closer to said pivot, said flange providing a suitable finger grip portion for use in turning the plate, said plate when turned to a position with the semi-circular periphery adjacent the slot preventing movement of the pin in the slot required in the folding of said support, and said plate when turned to another position with the flange parallel to the slot permitting such movement of the pin in the slot.

10. A device as set forth in claim 9, including means frictionally restraining rotation of said plate.

11. A lid support comprising a first arm pivotally attached to a lid, a second arm pivotally attached to a receptacle, said first arm having a free end portion bent into offset but parallel relation to the rest of the arm, the offset end portion having a slot provided therein and the extremity thereof having a notch provided therein, a first pin on the free end of the second arm operating in the slot and thereby pivotally and slidably connecting the free ends of said arms, a second pin on the second arm in longitudinally spaced relation to the first pin arranged to enter the notch when the arms are in supporting relation, and a head on the end of said pin to prevent endwise displacement of the pin from the notch, the outer surface of the head being rounded and the pin being of sufficient length so that said surface makes sliding wedging engagement with the first arm next to its offset end portion in the folding of the arms.

12. A lid support as set forth in claim 11, including means adjacent the pivotal attachment of the second arm to the receptacle for limiting folding pivotal movement of the second arm, whereby the second arm is supported against movement during the sliding wedging engagement of the pin head with the first arm recited.

13. A lid support comprising a first arm pivotally attached to a lid, a second arm pivotally attached to a receptacle, said first arm having a substantially V-shaped slot provided therein of substantially uniform width excepting at one end of one branch of the V which is enlarged to provide pin locating recesses on opposite sides thereof and a point at the bottom of the V which is enlarged to provide another or middle locating recess, a pin on the second arm operating in said slot, a pin on the second arm below said first pin, said first arm having a notch in the free end, and friction means restraining pivotal movement of the first arm relative to the lid, the first pin having a normal position in one of the end recesses when the lid is closed, said first arm adapted to move with the lid in its first movement toward opening position whereby the pin gravitates to the middle recess, and said first pin being adapted to move into the other branch of the V slot with the notch of the first arm receiving the second pin when the lid is in open position, and said first pin being adapted to gravitate back to the other branch of the V slot when the lid is raised preparatory to closing and being adapted to enter the other of the end recesses during the closing of the lid and simultaneous folding of the arms, and a safety lock device movably mounted on the first arm and having a straight sided portion which when moved into parallelism with the adjacent branch of the V slot permits movement of the first pin freely to and from the end recesses for folding of the arms, said device having another portion which when moved into position adjacent the slot prevents movement of the first pin into the last-named branch of the slot so as to prevent folding of said arms.

WALTER R. LUSTIG.